US 6,633,546 B1

(12) United States Patent
Inoue

(10) Patent No.: US 6,633,546 B1
(45) Date of Patent: Oct. 14, 2003

(54) NETWORK-PROVISIONING DATA GENERATING METHOD AND A TRANSMISSION DEVICE USING THE SAME

(75) Inventor: Yoshitsugi Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/261,339

(22) Filed: Mar. 3, 1999

(30) Foreign Application Priority Data

Mar. 4, 1998 (JP) .......................................... 10-052475

(51) Int. Cl.⁷ .......................... H04L 12/28; H04L 12/46
(52) U.S. Cl. ....................... 370/254; 370/902; 370/912; 379/15.03; 379/201.12; 709/220; 709/223; 709/246
(58) Field of Search ................................ 370/254, 902, 370/912; 379/15.03, 201.12; 709/220, 223, 246

(56) References Cited

U.S. PATENT DOCUMENTS 5,459,454 A * 10/1995 Nakano .................. 340/825.06
5,583,933 A * 12/1996 Mark .......................... 379/355
6,317,793 B1 * 11/2001 Toyosawa ................... 709/228

FOREIGN PATENT DOCUMENTS

JP 8-056233 2/1996
JP 8-181776 7/1996

\* cited by examiner

*Primary Examiner*—Hassan Kizou
*Assistant Examiner*—Joe Logsdon
(74) *Attorney, Agent, or Firm*—Katten Muchin Zavis Rosenman

(57) ABSTRACT

A network-provisioning data generating method, by which manual data registration can be prevented so that correct network provisioning data can be collected and registered in real time, and a transmission device, which is constituted according to the generated network structure, are provided. The network-provisioning data generating method includes the steps of transmitting between interfaces of transmission devices respectively connected, transmission information added with information of a transmission part, which is transmitting the transmission information, storing at a receiving site, received information of the transmission part, and information of a receiving part receiving the information of the transmission part, and combining the stored information of the transmission part with the stored information of the receiving part to transmit the combined information of the transmission part and the receiving part as device information, which is requested from a processor connected outside of the transmission devices.

15 Claims, 8 Drawing Sheets

EXAMPLE OF ARRANGING ON SET SITES

| A | A | B | A | A | C | C | C |
|---|---|---|---|---|---|---|---|
| 01 | 02 | 03 | 04 | 05 | 06 | 07 | 08 |

A, B, C : TYPE OF DEVICE
01-08 : NUMBER OF DEVICE

NETWORK-PROVISIONING DATA GENERATING METHOD AND A TRANSMISSION DEVICE USING THE SAME

BACKGROUND OF THE INVENTION

1. Field of the Invention

The present invention relates to a network-provisioning data generating method. More particularly, it relates to a method for automatically generating network-provisioning data, and a transmission device using the same.

2. Description of the Related Art

When constructing a network-provisioning data, a designer has designed information to be registered in a database system, according to a structure of connecting transmission devices forming a network. The designer has then verified the relationship of the connection or the data, and has registered the network-provisioning data.

In this case, the designer has to rely on other persons' help on some steps of constructing the provisioning data, and therefore, error data may be inserted in the provisioning data. Accordingly, it is necessary to verify the registered data. Then, it is essential to create a program that requires a special technique for the registered data verification.

On the other hand, a structure of a communication network is subject to be changed day by day by increasing or rearranging transmission devices. In the conventional method, a database adapted to a physical network structure is prepared. Then, the prepared database is used to obtain position information to cope with operations, such as a design of accommodating new lines, a diagnosis of the newly-accommodated lines, or a relief of failures. Therefore, it is required to continuously update the database.

To overcome the shortage of the above-described method, it is an object of the present invention to provide a network-provisioning data generating method, by which manual data registration can be prevented so that correct network provisioning data can be collected and registered in real time. It is another object of the present invention to provide a transmission device, which is constituted according to the generated network provisioning data.

It is further object of the present invention to provide a network-provisioning data generating method, by which a connection status is verified in a transmission device to use no registered data verification, and the network-provisioning transmission device using the method.

It is furthermore object of the present invention to provide a network-provisioning data generating method, by which manual registration of data can be prevented so that designing and verifying operations are not required, and to provide a network-provisioning transmission device using the method.

To achieve the above-described objects, according to the present invention, provided is a network-provisioning data generating method, including the steps of transmitting between interfaces of transmission devices respectively connected, transmission information added with information of a transmission part, which is transmitting the transmission information, storing at a receiving site, received information of the transmission part, and information of a receiving part receiving the information of the transmission part, and combining the stored information of the transmission part with the stored information of the receiving part to transmit the combined information of the transmission part and the receiving part as device information, which is requested from a processor connected outside of the transmission devices.

Further, in one preferred mode of the present invention, the information of the transmitting part indicates a sending interface of a transmission device transmitting the transmission information, and the information of the receiving part indicates a receiving interface of a transmission device receiving the transmitting part of the transmission information.

Alternatively, the transmission information includes information of a set site where the transmission device is set, which transmits the transmission information.

Furthermore, the transmission information is inserted on an over head and transmitted.

Further, the combined information of the transmission part and the receiving part is commonly received by a common processor provided for plural transmission devices.

Alternatively, in the other preferred mode, the transmission devices include first transmission devices having no function of transmitting the information of the transmission part, and second transmission devices connected to the first transmission devices include a functional portion for setting connected relation between the first and second transmission devices.

Furthermore, in one preferred mode, the transmission devices replace the stored information of transmitting parts with invalid information, when a communication failure is detected. Alternatively, the combining and outputting means informs the replaced invalid information as the information of transmitting parts to the processor means, when transmitting the requested device information.

Further, other objects of the present invention will become clear by the description for explaining embodiments according to the attached drawings.

DESCRIPTION OF THE PREFERRED EMBODIMENTS

Figure 1:
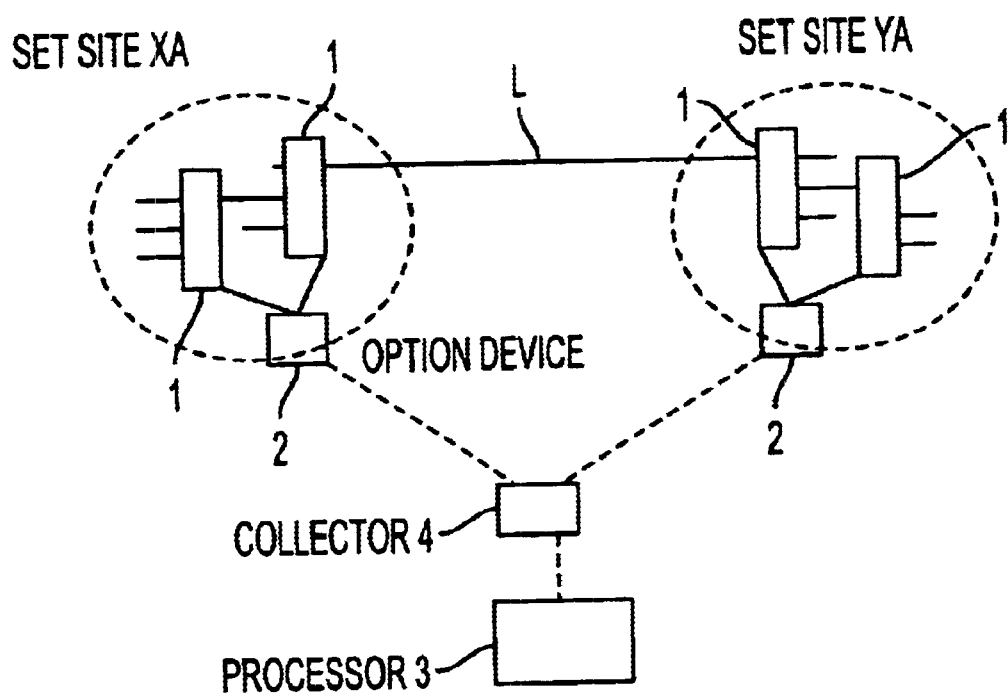
FIG. 1 is a diagram of an embodiment according to the present invention, employing device information of a transmission device.

Embodiments according to the present invention will be now explained in accompanying with drawings. Throughout the following descriptions, the same reference numerals are used to denote and identify corresponding or identical components in the drawings.

Figure 6:
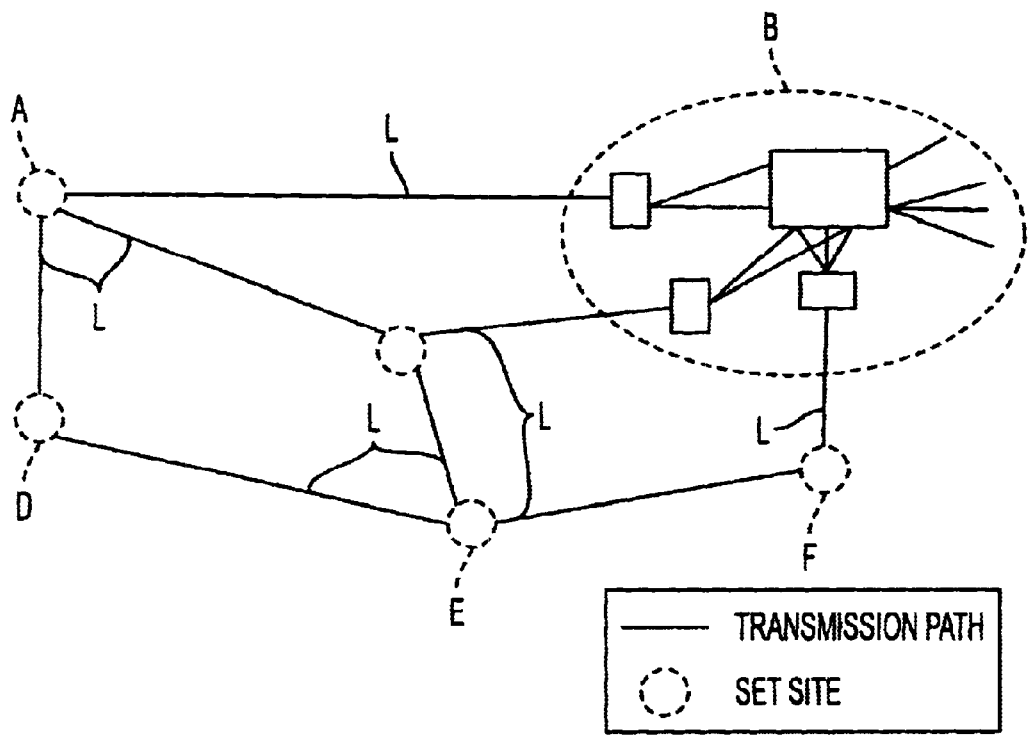
FIG. 6 is a diagram showing a general network structure.
Figure 7:
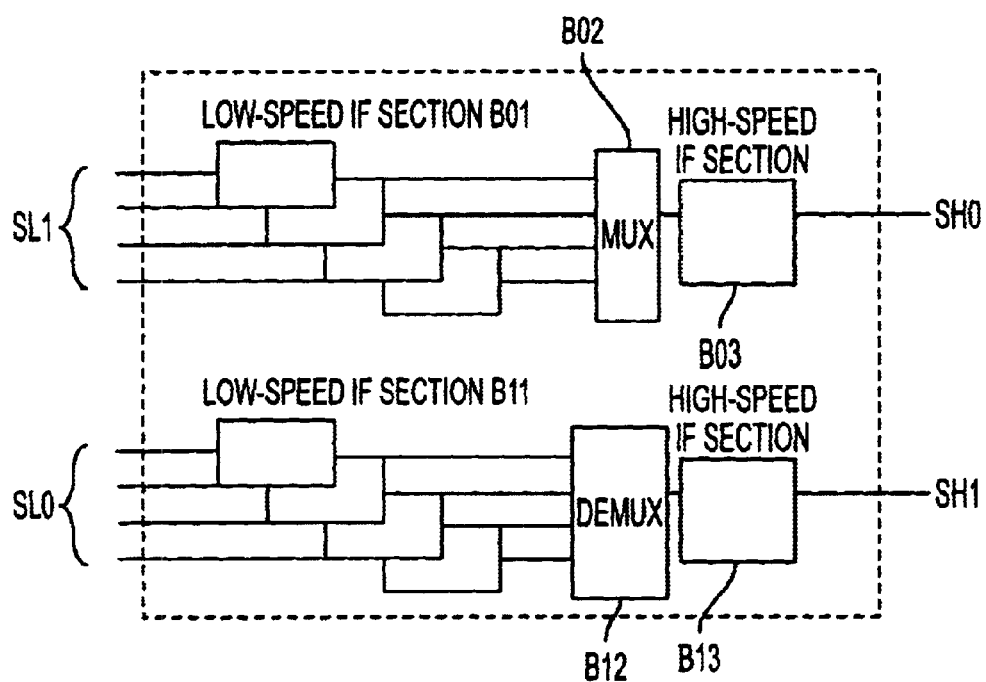
FIG. 7 is a diagram showing a structural example of multiplexing/demultiplexing sections, which are used in a digital transmission device.
Figure 8:
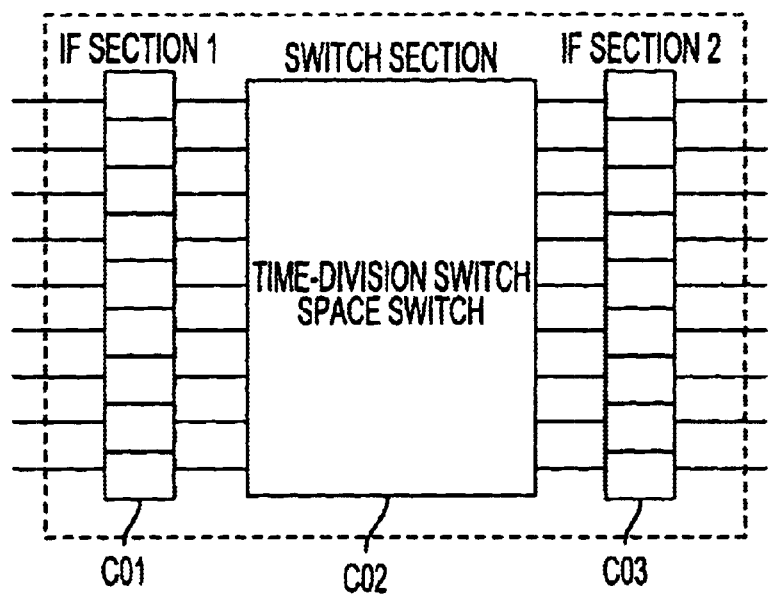
FIG. 8 is a diagram showing an example of a line editing device, which is used in a digital transmission device.

FIG. 6 shows one general structural example of a network system. Repeating nodes A to F are linked by a transmission path L. A transmission device is arranged in each of the repeating nodes A to F. A transmission device is a digital transmission device, which processes mainly. As shown in FIGS. 7 and 8, the digital transmission device can be roughly classified into a multiplexing/demultiplexing device (refer to FIG. 7) and a device, which edits a path and a line, (hereinafter, it is called a line editing device. Refer to FIG. 8).

In the multiplexing/demultiplexing device shown in FIG. 7, a multiplexing section B02 multiplexes plural low-speed communication signals SL1, which are input through low-speed interface sections B01, into one high-speed communication signal SH0 in time division. The multiplexed high-speed communication signal SH0 is output through a high-speed interface section B03. Seven low-speed signals of 6 Mbps, for example, are converted into one high-speed signal of 50 Mbps in time division, for example.

On the other hand, a high-speed communication signal SH1 flowing toward a reverse direction is input to a high-speed interface section B13, and the demultiplexing section B12 demultiplexes the high-speed communication signal SH1 into plural low-speed communication signals SL0. Then, the demultiplexed plural low-speed communication signals SL0 are output through the corresponding low-speed interface sections B11. One high-speed communication signal of 150 Mbps is demultiplexed into three low-speed communication signal of 50 Mbps, for example.

On the other hand, a line editing device of FIG. 8, which is one digital transmission device, includes a switch section C02 having time and space switches, and interface sections C01 and C03, which are arranged on both input sides of the switch section C02.

In this structure, the line editing device rearranges signals input from the interface section C01 or C03 at the switch section C02, and outputs the signals to the interface section C03 or C01.

Figure 9:
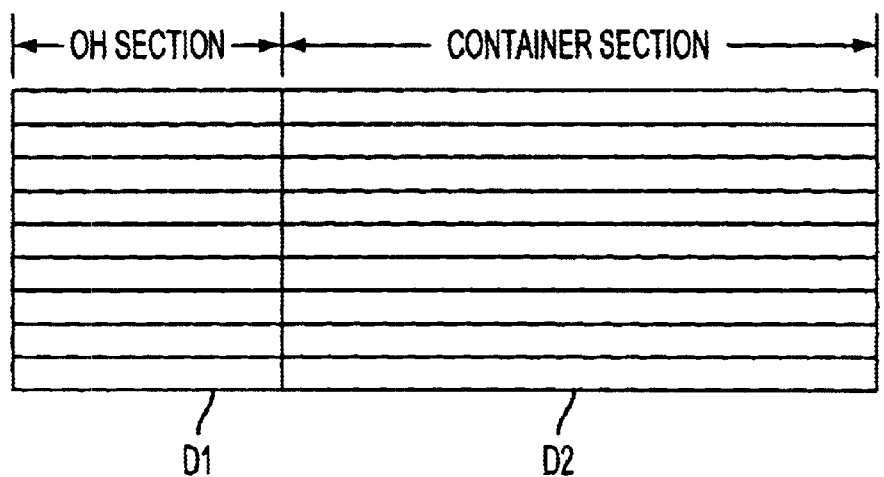
FIG. 9 is a diagram showing a structural example of a signal for connecting digital transmission devices.

FIG. 9 shows an example of a signal format for connecting the digital transmission devices. A signal for connecting transmission devices is transmitted with this signal format shown in FIG. 9. D1 of the signal format is an over head (OH) section, which transmits a synchronization information of the entire signal, check information of transmission error, information for verifying the quality, and auxiliary information. D2 is a container section, which transmits information for communication services.

Figures 10, 11:
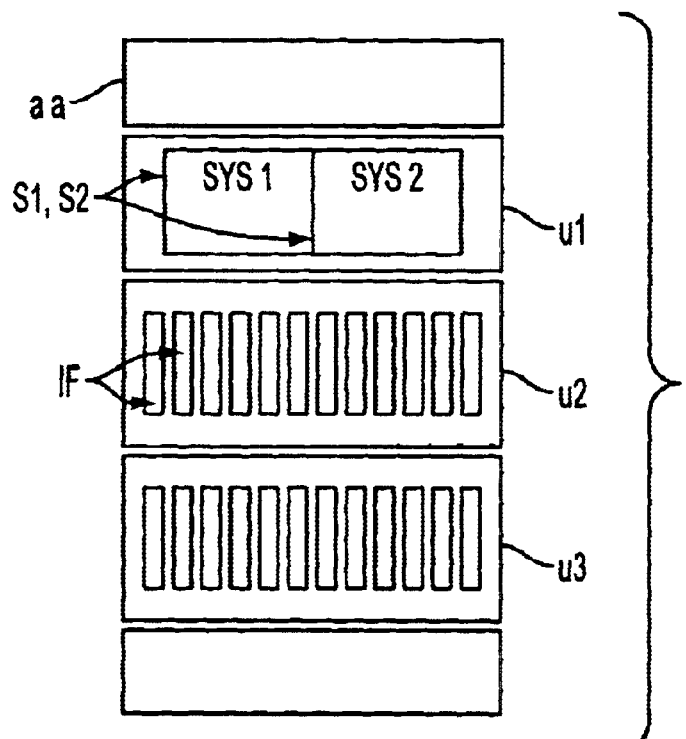
FIG. 10 is an explanatory diagram of an arrangement example on a set site to identify a device structure.
FIG. 11 is a diagram explaining a structural example of a device having a device number.

FIGS. 10 and 11 are diagrams explaining information for identifying a device structure. A transmission device arranged in one node has a device type, by which the device is classified into either of the multiplexing/demultiplexing device or the line editing device, as described in FIGS. 7 and 8, respectively. Each of the transmission devices further has one device number.

In the example of FIG. 10, devices having the device types A, B, and C are arranged in an order of A, A, B, A, A, C, C, C. The devices respectively have device numbers 01 to 08. FIG. 11 is a structural example of the device having one device number. The device having one device number aa includes plural units, which respectively have unit numbers u1, u2 and u3. Each unit has working and protection systems S1 and S2. Each unit further has plural panels, each of which has an interface number IF, for example.

Figure 12:
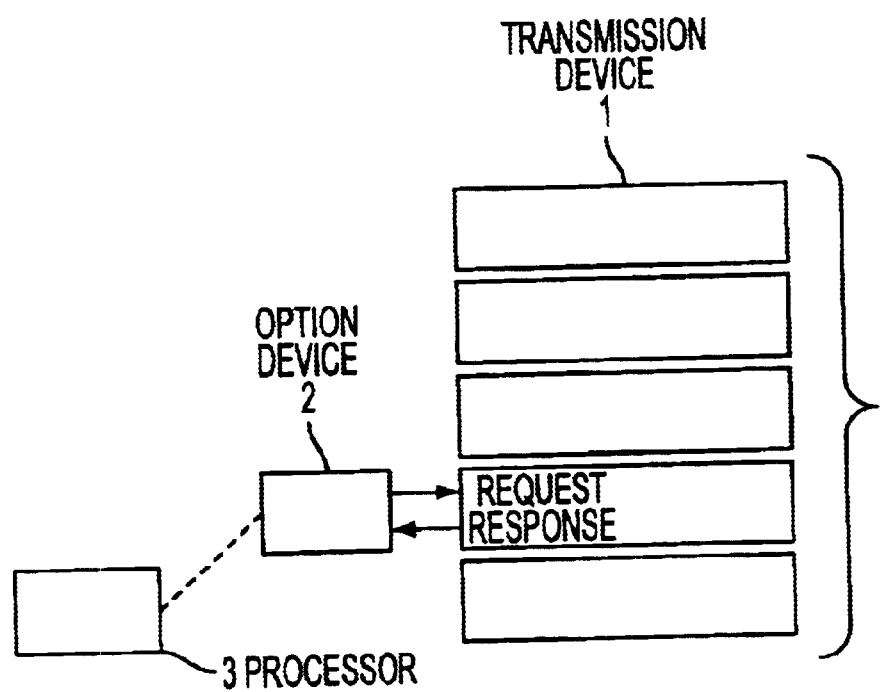
FIG. 12 is a diagram explaining a connection relationship between the transmission device 1 and an option device 2 for control and a processor 3.

On the other hand, the above-described transmission device has a function for recording information relating to the structure and setting information of the device. As shown in FIG. 12, the transmission device 1 is connected to a processor 3 through an option device 2 for control. Therefore, it becomes possible to read out request data from the transmission device 1, according to the request sent from the processor 3, and record the data in the processor 3.

The option device 2 has a function for controlling to change the setting of the transmission device 1 and informing the result to the processor 3.

FIG. 1 shows an embodiment according to the present invention employing the device information of the transmission device 1 assuming the general network structure. In other words, plural transmission devices 1 are provided on two set sites, i.e., two nodes XA and YA, in the embodiment of FIG. 1. The transmission device information is sent to the processor 3, after the commonly-used collector 4 collects the information through the corresponding option devices 2.

Therefore, in the embodiment of FIG. 1, one processor 3 can collect device information of the plural transmission devices 1, which are provided on plural nodes.

Figure 2:
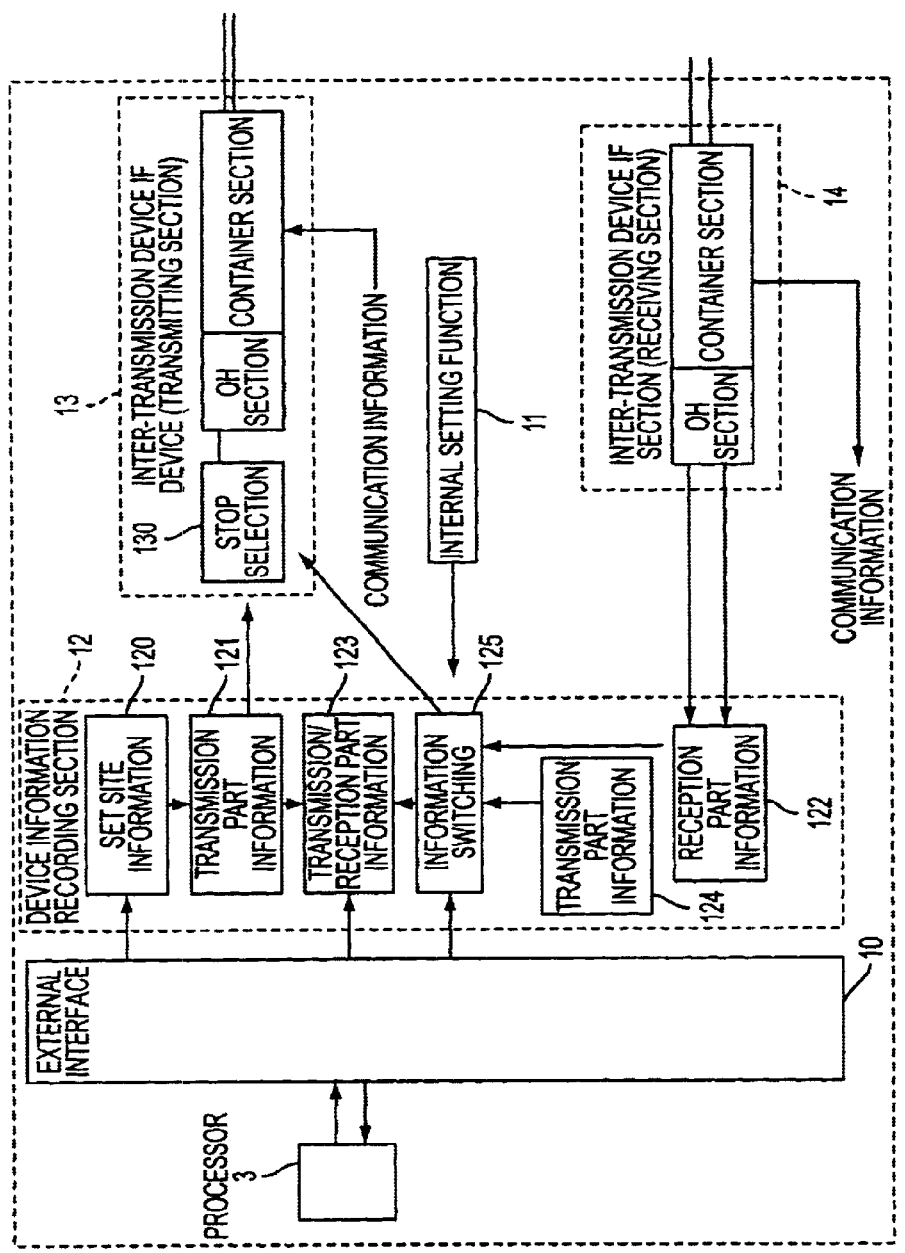
FIG. 2 is a structural block diagram of the transmission device 1.

FIG. 2 shows a structural example of the transmission device 1. The transmission device 1 and the processor 3 are shown for simplicity as if they are directly connected. However, this is only for illustrating a general structure. When employing the structure of FIG. 2 in the embodiment of FIG. 1, for example, the option device 2 on a set site or node position and a commonly used collector 4 are further provided.

The operations shown in FIG. 2 will be now explained. Information relating to a set site of the transmission device 1 is recorded in a set site recording area 120 of a device information recording section 12 under the control of an external device through an external interface 10 or an internal setting functional section 11.

The transmission part information as explained by FIGS. 10 and 11 is included in the over head (OH) section D1 in a signal format of FIG. 9 for connecting devices. The transmission part information is recorded in a transmission part information recording area 121 of the device information recording section 12. Then, the transmission part information is united with the set site information recorded in the set site recording area 120. Further, a synchronous code for communication, a frame check code, and an end code are attached to the united information. Then, the information is edited as transmission information as shown in FIG. 3.

Figure 3:
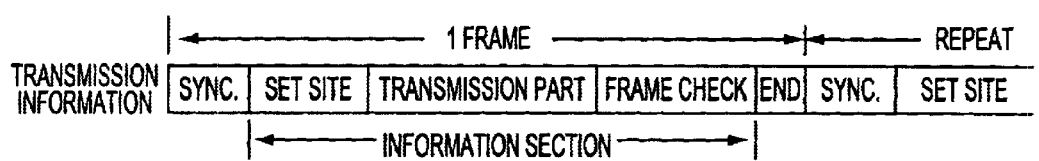
FIG. 3 is an explanatory diagram of editing transmitting information.

As shown in FIG. 3, a synchronization bit, a set site bit, a transmission part bit, a frame check bit, and an end bit are respectively expressed by bit 1 or 0 information and are arranged in the order in one communication frame of the edited transmission information.

An inter-transmission device interface section (transmitting section) 13 receives the communication frame in synchronous with a transmission timing. The communication frame is divided in every one bit or one byte and positioned on a specified position of the over head (OH) section D1. The communication frame positioned on the specified positions are then transmitted to an inter-transmission device interface section (receiving section) 14 of the faced transmission device. Further, communication service information is inserted on the container section D2.

In here, a relationship of transmission and reception of information between digital transmission devices has a structure of 1:1 or 1:N. Combination in the structure and the number (N) of the connectable digital transmission devices are determined according to a designed condition of the above-described interface sections 13 and 14.

The inter-transmission device interface section (receiving section) 14 of the faced transmission device 1 continuously monitors a specified part of the over head (OH) section D1 of the received signal, and detects the synchronous code. After that, the section 14 continuously reads to the frame check bit to verify the frame. If the data is normal, the section 14 records the data at the reception part information recording area 122 of the device information recording section 12.

When an abnormal result is detected, or the synchronous code can not be received during a constant interval, the receiving section 14 detects the abnormal communication. Therefore, the record of the reception part information is replaced with invalid information, for example, a FFFF code, so that information is recorded indicating "non-connection" of transmission devices.

Figure 4:
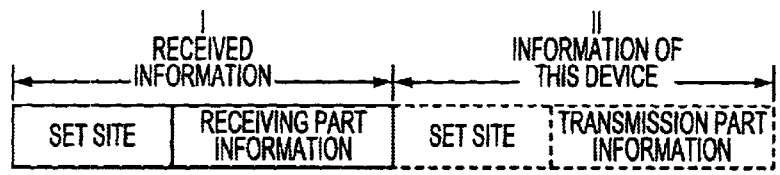
FIG. 4 is an explanatory diagram of a format recorded and stored in a transmission/reception part information recording area.

Then, a content I of the reception part information of the transmission device received from the faced transmission device and recorded in the reception part information recording area 122, and a content II of the transmission part information recorded in the transmission part information recording area 121 of the own transmission device are edited with a format shown in FIG. 4. Then, the edited information is recorded and maintained in the transmission/reception part information recording area 123.

Therefore, when receiving a request of the device information from the faced transmission device 1, contents recorded and maintained in the transmission/reception information recording area 123 are transmitted through the external interface 10, an option device 2 and a communication network L.

When connecting between the transmission device 1 having the function of the present invention and a transmission device not having the function, the external interface section 10 or the internal setting functional section 11 replaces the transmission part information, to which the receiving section 14 is connected, into the setting information sent from the transmission part information recording area 124 at an information switching section 125, and makes the replaced information valid.

When setting and replacing the information at the information switching section 125, a stop selecting section 130 of the transmitting section 13 is controlled to stop transmitting the transmission part information, that is, the content of the transmission part information recording area 121.

Further, when detecting a communication failure at the receiving section 14, the reception part information of the transmission/reception part information recording area 123 is replaced with invalid information. When restoring the communication, the setting data of the transmission part information recording area 124 is set to the transmission/ reception part information recording area 123.

A communication network is constituted by the digital transmission device 1 according to the present invention. Further, an option device 2, which reads out device information of the transmission device 1 is provided in every set site of the network. Further, the option device 2 is connected to the processor 3, which is set at a management section through a communication line. Device information of each transmission device is collected from the processor 3, and is used as inter-transmission device connection information of the network-provisioning information.

Further, the same structure as that of the above-explained embodiment can be employed by adding the structure according to the present invention to the transmission device 1, which includes a function of reading the device information of the transmission device 1 sent from the external interface 10.

Figure 5:
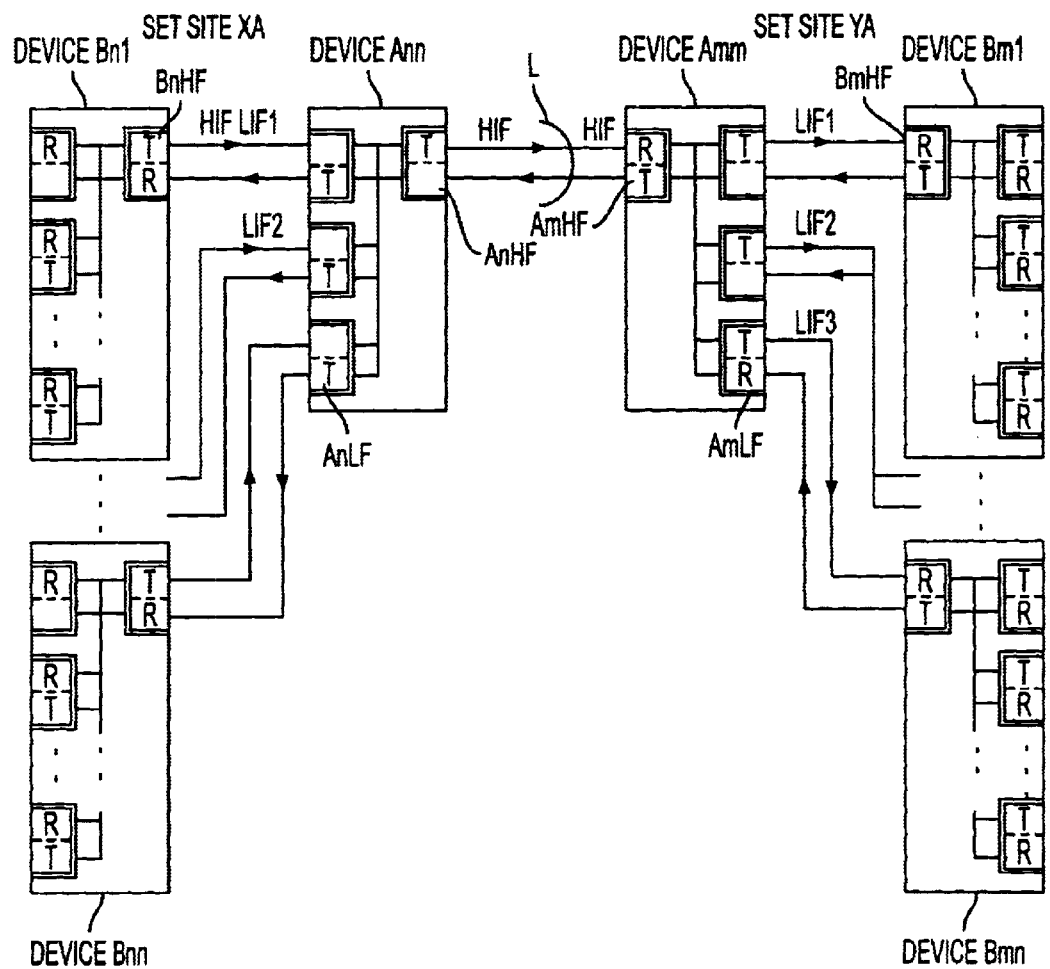
FIG. 5 explains a relationship between set sites XA and YA in FIG. 1 to explain reading out transmission part information and device information.

FIG. 5 is an explanatory diagram of a case where a relationship between set sites XA and YA shown in FIG. 1 is used to read the transmission part information and the device information.

High-speed interfaces BnHF of plural transmission devices Bn1 to Bnn and low-speed interfaces AnLF of an upper-level transmission device Ann are connected on a set site XA.

On the other hand, high-speed interfaces BmHF of plural transmission device Bm1 to Bmn and low-speed interfaces AmLF of an upper-level transmission device Amm are connected on a set site YA. Additionally, the upper-level transmission device Ann on the set site XA and the upper-level transmission device Amm on the set site YA are connected through a transmission path L.

In the relationship of FIG. 5, a structure of the transmission part information, which is transmitted by the high speed interface AnHF of the transmission device Ann on the set site XA, according to the present invention, can be expressed as follows:

Set site (XA)+Device type (NNNN)+Device number (Ann)+Unit number (99)+IF number (99)+IF type (HF).

Further, on the above, (NNNN) shows a Japanese title or information, which is coded by alphabet and numerals, (99) means numerals, which are expressed by alphabet and numerals. They are also the same in the following explanations.

On the contrary, a structure of the transmission part information, which is transmitted by the low-speed interface AnLF of the transmission device Ann on the set site XA, can be expressed as follows:

Set site (XA)+Device type (NNNN)+Device number (Ann)+Unit number (99)+SYS number (99)+IF number (99)+IF type (LF).

Similarly to that, the structure of the transmission part information, which is transmitted by the high-speed interface BnHF of the transmission device Bn1 on the set site XA, can be expressed as follows:

Set site (XA)+Device type (NNNN)+Device number (Bn1)+Unit number (99)+SYS number (99)+IF number (99)+IF type (HF).

Further, a structure of the transmission part information, which is transmitted by the high-speed interface AmHF of the transmission device Amm on the set site YA, can be expressed as follows:

Set site (YA)+Device type (NNNN)+Device number (Amm)+Unit number (99)+SYS number (99)+IF number (99)+IF type (HF).

On the other hand, device information of the high-speed interface AnHF of the transmission device Ann on the set site XA is constituted by reception part information I and transmission part information II of the own device.

The reception part information I at that time can be constituted as follows:

Set site (YA)+Device type (NNNN)+Device number (Amm)+Unit number (99)+IF number (99)+IF type (HF).

Further, the transmission part information II of the own transmission device can be constituted as follows:

Set site (*XA*)+Device type (*NNNN*)+Device number (*Ann*)+Unit number (99)+*SYS* number (99)+*IF* type (99)+*IF* type (*HF*).

Similarly to that, the reception part information I on the device information of the high-speed interface AmHF of the transmission device Amm on the set site YA can be constituted as follows:

Set site (*XA*)+Device type (*NNNN*)+Device number (*Ann*)+Unit number (99)+*SYS* number (99)+*IF* number (99)+*IF* type (*HF*).

Further, the transmission part information II of the transmission device can be constituted as follows:

Set site (*YA*)+Device type (*NNNN*)+Device number (*Amm*)+Unit number (99)+*SYS* number (99)+*IF* number (99)+*IF* type (*HF*).

Alternatively, on the device information of the high-speed interface BnHF of the transmission device Bn1 on the set site XA, the reception part information I can be constituted as follows:

Set site (*XA*)+Device type (*NNNN*)+Device number (*Ann*)+Unit number (99)+*SYS* number (99)+*IF* number (99)+*IF* type (*LF*).

Further, the transmission part information II of the own transmission device can be constituted as follows:

Set site (*YA*)+Device type (*NNNN*)+Device number (*Bn*1)+Unit number (99)+*SYS* number (99)+*IF* number (99)+*IF* type (*LF*).

As is explained in accompanying with the attached drawings, according to the present invention, the following functions are attached to a digital transmission device to collect and register connection information of physical transmission devices for registering a network-provisioning database system. Thereby, it is possible to simplify the network-provisioning database system and automatically register the network-provisioning data.

Thereby, it becomes possible to collect and register the connection information of transmission devices, which is the most important to construct the network-provisioning database and is varied heavily, in real time on line.

Therefore, it can be prevent from inserting error data in comparison with the case where manual data registration is performed by operators in the conventional method. Additionally, there is no need to verify the registration data on the processor because the transmission device verifies the connection status. Although it was required to prepare for data registration when the data registration is performed by operators, the design and verification operations become needless according to the functions of the present invention.

The present invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A network-provisioning data generating method, comprising the steps of:

transmitting between interfaces of transmission devices respectively connected, transmission information including information of a transmission part, from which the transmission information is transmitted;

storing the information of the transmission part included in the transmission information received at a receiving site, and information of a receiving part, at which the transmission information is received; and combining the stored information of the transmission part with the stored information of the receiving part and to output the combined information as device information, which is to be requested from a processor connected outside of the transmission devices.

2. The network-provisioning data generating method according to claim 1, wherein the information of the transmission part indicates a sending interface of a transmission device transmitting the transmission information, and the information of the receiving part indicates a receiving interface of a transmission device receiving the information of the receiving part.

3. The network-provisioning data generating method according to claim 1, wherein the transmission information includes information of a set site where the transmission device is set, which transmits the transmission information.

4. The network-provisioning data generating method according to claim 1, wherein the transmission information is inserted on an over head of a signal format to be transmitted.

5. The network-provisioning data generating method according to claim 1, wherein the combined information of the transmission part and the receiving part is commonly received by a common processor provided for a plurality of transmission devices.

6. A network system having transmission devices respectively connected, comprising:

a transmitter transmitting between interfaces of the transmission devices respectively connected, transmission information including information of a transmission part, from which the transmission information is transmitted;

a storage device storing the information of the transmission part included in the transmission information received at a receiving site, and information of a receiving part, at which the transmission information is received;

a transmission interface combining the stored information of the transmission part with the stored information of the receiving part and for outputting the combined information of the transmission part and the receiving part as device information; and a processor connected outside of the transmission devices for receiving requested device information from the transmission devices.

7. The network system according to claim 6, further comprising:

means connected to the transmission devices for collecting the device information from the transmission devices and sending the collected device information to the processor.

8. The network system according to claim 6, wherein the transmission information includes information of a set site where a transmission device is set, which transmits the transmission information.

9. The network system according to claim 6, wherein the transmission information is inserted on an overhead and transmitted.

10. The network system according to claim 6, further comprising:
   a common processor provided for a plurality transmission devices for collecting the combined information of the transmission part and the receiving part and for sending to the processor, the collected, combined information as device information.

11. The network system according to claim 6,
   wherein the transmission devices include first transmission devices having no function of transmitting the information of the transmission part, and second transmission devices connected to the first transmission devices, the second transmission devices include a functional portion for setting a connection relationship between the first and second transmission devices.

12. The network system according to claim 11,
   wherein information of transmitting parts of the first devices is set in the functional portion of the second transmission device from an external interface.

13. The network system according to claim 11,
   wherein the second transmission device stops the function of transmitting the information of the transmission parts, and employing the information of transmitting parts set on the functional portion, as information of connected relation, to correspond to functional stop of each interface.

14. The network system according to claim 6,
   wherein the transmission devices replace the stored information of transmitting parts with invalid information, when a communication failure is detected.

15. The transmission device according to claim 14,
   wherein the transmission devices inform the replaced invalid information as the information of transmitting parts to the processor when transmitting the requested device information.

* * * * *